(12) United States Patent
Weis et al.

(10) Patent No.: US 10,794,339 B2
(45) Date of Patent: Oct. 6, 2020

(54) VALVE

(71) Applicant: Continental Automotive GmbH, Hannover (DE)

(72) Inventors: Christian Weis, Budenheim (DE); Carsten Mikolajek, Griesheim (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 201 days.

(21) Appl. No.: 15/780,735

(22) PCT Filed: Dec. 5, 2016

(86) PCT No.: PCT/EP2016/079774
§ 371 (c)(1),
(2) Date: Jun. 1, 2018

(87) PCT Pub. No.: WO2017/097714
PCT Pub. Date: Jun. 15, 2017

(65) Prior Publication Data
US 2018/0372033 A1    Dec. 27, 2018

(30) Foreign Application Priority Data

Dec. 7, 2015 (DE) .......................... 10 2015 224 466

(51) Int. Cl.
| | |
|---|---|
| F02M 26/67 | (2016.01) |
| F16K 31/04 | (2006.01) |
| F02M 26/54 | (2016.01) |
| F16K 31/54 | (2006.01) |

(52) U.S. Cl.
CPC ............ *F02M 26/67* (2016.02); *F02M 26/54* (2016.02); *F16K 31/047* (2013.01); *F16K 31/54* (2013.01)

(58) Field of Classification Search
CPC ...... F02M 26/54; F02M 26/67; F16K 31/047; F16K 31/54
See application file for complete search history.

(56) References Cited

U.S. PATENT DOCUMENTS

| | | | |
|---|---|---|---|
| 5,529,282 A | 6/1996 | Lebkuchner | |
| 6,443,135 B1 * | 9/2002 | Dismon | ........... F02M 35/10222 |
| | | | 123/568.18 |
| 7,252,618 B2 * | 8/2007 | Spakowski | ............ F02M 26/54 |
| | | | 475/343 |

(Continued)

FOREIGN PATENT DOCUMENTS

| | | |
|---|---|---|
| CN | 1580616 | 2/2005 |
| CN | 1637236 | 7/2005 |

(Continued)

*Primary Examiner* — Eric Keasel
(74) *Attorney, Agent, or Firm* — Cozen O'Connor

(57) ABSTRACT

A valve for opening or closing a flow section has: a valve disk, a valve plunger and a transmission for converting rotary motion into translational motion. The transmission has a rocker arm mounted to rotate about an axis of relation, the rocker arm is linked to the valve plunger by connecting rods, and the connecting rods are mounted to rotate relative to the rocker arm and the valve plunger. A restoring device generates a force component to counteract a movement of the valve plunger transmitted to the valve plunger by the rocker arm and the connecting rods.

9 Claims, 3 Drawing Sheets

(56) References Cited

U.S. PATENT DOCUMENTS

| | | | |
|---|---|---|---|
| 8,490,605 B2* | 7/2013 | Gracner | F02B 37/186 123/188.1 |
| 9,140,218 B2* | 9/2015 | Keefover | F16K 31/52408 |
| 9,188,088 B2* | 11/2015 | Eggler | F16K 31/047 |
| 9,322,365 B2 | 4/2016 | Simons | |
| 9,353,706 B2* | 5/2016 | Telep | F16K 31/047 |
| 9,464,540 B2* | 10/2016 | Jelinek | F01L 1/12 |
| 2010/0176325 A1 | 7/2010 | Klipfel et al. | |
| 2010/0319663 A1 | 12/2010 | Gracner et al. | |
| 2013/0139503 A1 | 6/2013 | Eggler et al. | |

FOREIGN PATENT DOCUMENTS

| | | |
|---|---|---|
| CN | 102454818 | 5/2012 |
| DE | 44 38 250 A1 | 5/1996 |
| DE | 198 54 614 A1 | 5/2000 |
| DE | 10 2007 054 769 A1 | 5/2009 |
| DE | 10 2010 022 736 A1 | 12/2011 |
| EP | 2 172 682 A1 | 4/2010 |

* cited by examiner

VALVE

CROSS-REFERENCE TO RELATED APPLICATIONS

This is a U.S. national stage of application No. PCT/EP2016/079774, filed on 5 Dec. 2015, which claims priority to the Germany Application No. 10 2015 224 466.0 filed 7 Dec. 2015, the content of both incorporated herein by reference.

BACKGROUND OF THE INVENTION

1. Field of the Invention

The invention relates to a valve for opening or closing a flow path.

2. Related Art

In numerous application areas, rotational movements of a drive motor are converted into a linear or a translational movement for the purposes of actuating a valve. This principle is also applied, for example, in valves for controlling exhaust-gas recirculation in motor vehicles. For this purpose, use is often made of a gear transmission that converts the rotational movement into a linear or translational movement by a corresponding kinematic mechanism. The conversion of the rotational movement may be realized, for example, by a crank drive or a slotted-link mechanism. For this purpose, a wide variety of structural designs are known in the prior art.

A disadvantage of devices of this type is in particular that, during the conversion of the movement, undesired transverse forces are generated, which can be transmitted to the valve plunger or to the valve disk. This leads to greater wear and to a reduced service life. Jamming of the valve can also occur. Fgenerated count It is furthermore a disadvantage that, in particular slots in slotted-link mechanisms have to be produced with vary high production accuracy in order to minimize the play at the valve disk and the valve plunger. It is also a disadvantage that, owing to installation space requirements and the structural design of crank drives or slotted-link drives, it is often the case that only one-sided mounting of the valve plunger or of the kinematic mechanism for converting the movement is provided, which can result in particular in tilting or jamming of the valve plunger.

SUMMARY OF THE INVENTION

It is therefore an object of the present invention to create a valve which has as simple a construction as possible and in which, during operation, the valve plunger is acted on by the lowest possible transverse forces or moments that impair the durability of the valve.

The object may be achieved, with regard to the valve, in accordance with a first aspect of the present invention by a valve for opening or closing a flow path, having a valve disk, having a valve plunger and having a transmission device for converting a rotational movement into a translational movement, wherein the transmission device is formed by a rocker arm which is mounted so as to be rotatable about an axis of rotation, wherein the rocker arm is connected by thrust rods to the valve plunger, wherein the thrust rods are mounted so as to be rotatable relative to the rocker arm and relative to the valve plunger, wherein the valve has a restoring device by which a force component can be generated that counteracts a movement of the valve plunger that can be transmitted by the rocker arm and the thrust rods to the valve plunger.

A valve of the type described above is advantageous in particular for use in an exhaust-gas recirculation system. By the valve disk, which is preferably arranged in a valve seat, a flow path can be opened up by the valve disk being moved out of the valve seat. The closure of the flow path can be realized by the valve disk being moved into the valve seat.

The conversion of the rotational movement of an electric motor into a translational movement can be realized by the transmission device. Here, it is substantially the valve plunger and the valve disk connected rigidly to the valve plunger that are moved in translational fashion. To ensure reliable closure of the valve, it is particularly advantageous for a restoring device to be provided that counteracts the opening movement of the valve. The force component generated by the restoring device in this case acts particularly preferably exactly oppositely to the adjustment direction of the valve plunger. It can be achieved in this way that, in the event of a failure of the drive motor or in the event of some other malfunction that has the effect that an actuating force is no longer transmitted from the drive motor to the valve plunger, a closure of the valve is realized by the restoring device. In this way, damage to the valve, in particular to the valve disk or to the valve plunger, can be avoided. An uncontrolled flow through the flow path can also be avoided.

It is particularly advantageous if the compression direction and the expansion direction of the restoring device run parallel to the central axis of the valve plunger. This is particularly advantageous for reducing, or even preventing entirely, the generation of transverse forces or disruptive moments that could oppose the movement of the valve plunger. Here, it is in particular crucial that the force vectors run approximately parallel to one another, so as not to cause tilting or jamming of the valve plunger or of the valve disk. In a real system, a completely parallel arrangement and completely parallel guidance cannot be achieved, because it is basically always the case that a certain degree of tilting will occur between the elements. However, the degree of tilting of the elements with respect to one another is preferably kept very small. Tilting by at most 0.5 degrees in each direction is particularly advantageous.

By transverse forces, the force required for the actual adjustment may be increased, which can firstly result in damage being caused to the valve, and can secondly also result in energy-inefficient operation of the valve.

It is also advantageous if the restoring device is formed by two springs arranged parallel to one another. By using two springs arranged parallel to one another, in particular spiral springs whose central axes both run parallel to the central axis of the valve plunger, a particularly homogeneous introduction of force into the valve plunger can be achieved. Owing to an unavoidable offset in a radial direction between the central axis of the valve plunger and the central axes of the springe and the resulting lever arm, moments inevitably arise that act about the valve plunger and turn the valve plunger out of its original position. By the arrangement of springs on two sides of the valve plunger, the moment generated by one spring can be compensated by the moment generated by the respective other spring. Furthermore, by the arrangement of two springs, the assembly of the restoring device can be simplified.

A preferred exemplary embodiment is characterized in that the springs are coupled to one another by plate-like projections of the valve plunger. This is particularly advantageous for achieving that the forces generated by the springs are introduced directly into the valve plunger.

It is also preferable if the restoring device is supported with respect to a spatially fixed structure surrounding the valve, wherein a spring force can be transmitted between the spatially fixed structure and the valve plunger. This is advantageous in order to generate a force component for the restoring movement of the valve plunger. Support of the springs on the valve itself would be highly cumbersome in terms of construction, and would lead to a highly complex design of the valve.

It is furthermore advantageous if the valve plunger is supported with respect to a spatially fixed structure surrounding the valve by exactly one radial bearing. The use of only one radial bearing, for example a sliding sleeve, is particularly advantageous because, in this way, the construction of the valve is simplified and thus the assembly and the required structural space are reduced. In an alternative embodiment, it is also possible for multiple radial bearings to be provided which, in an axial direction, each have a shorter extent than the single radial bearing. In the case of multiple short radial bearings, the radial bearings are preferably arranged in the immediate vicinity of the end regions of the valve plunger in order to effectively prevent tilting of the valve plunger.

It is furthermore advantageous if the thrust rods are rigidly connected to one another such that movement coupling is realized between two thrust rods. This is advantageous in order to achieve altogether greater stability in the valve, and in particular to avoid relative rotations and tilting. In particular, the kinematics of the valve are considerably improved in this way. The two thrust rods may, for example, be welded, to one another or rigidly connected to one another by another coupling element that does not restrict the free movement of the valve plunger.

It is also expedient for the rocker arm to form, together with the thrust rods and the valve plunger, a knee lever joint. A knee lever joint forms a particularly robust and stable joint, which is advantageous in particular for the transmission of relatively small movements. The maximum possible movement by the knee lever joint can be influenced in particular by the arrangement of the axis of rotation of the rocker arm and the connection of the thrust rods to the rocker arm in relation to the axis of rotation.

It is furthermore advantageous if the thrust rods have apertures through which the valve plunger arranged between the thrust rods is accessible. The apertures are formed in particular by punched-out portions in the thrust rods. These apertures advantageously permit access to the valve plunger arranged between the thrust rods. This is advantageous in particular for assembly purposes because, for example, the connection between the springe and the plate-like elements of the valve plunger can be produced more easily.

The apertures are furthermore advantageous for also permitting the use of particularly long valve plungers. Through the use of long valve plungers, the acting transverse forces can be further reduced. To be able to use as long a valve plunger as possible despite the normally very restricted structural space, it is advantageous if the valve plunger can also be accessed through the thrust rods. This in particular considerably simplifies the assembly process.

It is furthermore expedient if the valve plunger has, in the region accessible through the apertures in the thrust rods, a receiving region for a sensor element and/or for the connection of a shaft for the mounting of the thrust rode. This is advantageous in order, for example, for a position sensor to be mounted on the valve plunger in order to thereby perform realtime monitoring of the position of the valve plunger.

It is also preferable if the thrust rods are mounted so as to be rotatable relative to the valve plunger and the rocker arm. It is only by a rotatable mounting of the thrust rods that the knee lever joint can be realized in fully functional form, because a relative movement, in particular a relative rotation, between the rocker arm and the thrust rods and between the thrust rods and the valve plunger is necessary in order to realize an adequately large adjustment travel of the valve.

Advantageous refinements of the present invention are described in the following description and the figures.

BRIEF DESCRIPTION OP THE DRAWINGS

The invention will be discussed in detail below on the basis of exemplary embodiments and with reference to the drawings, in which.

DETAILED DESCRIPTION OF THE PRESENTLY PREFERRED EMBODIMENTS

Figure 1:
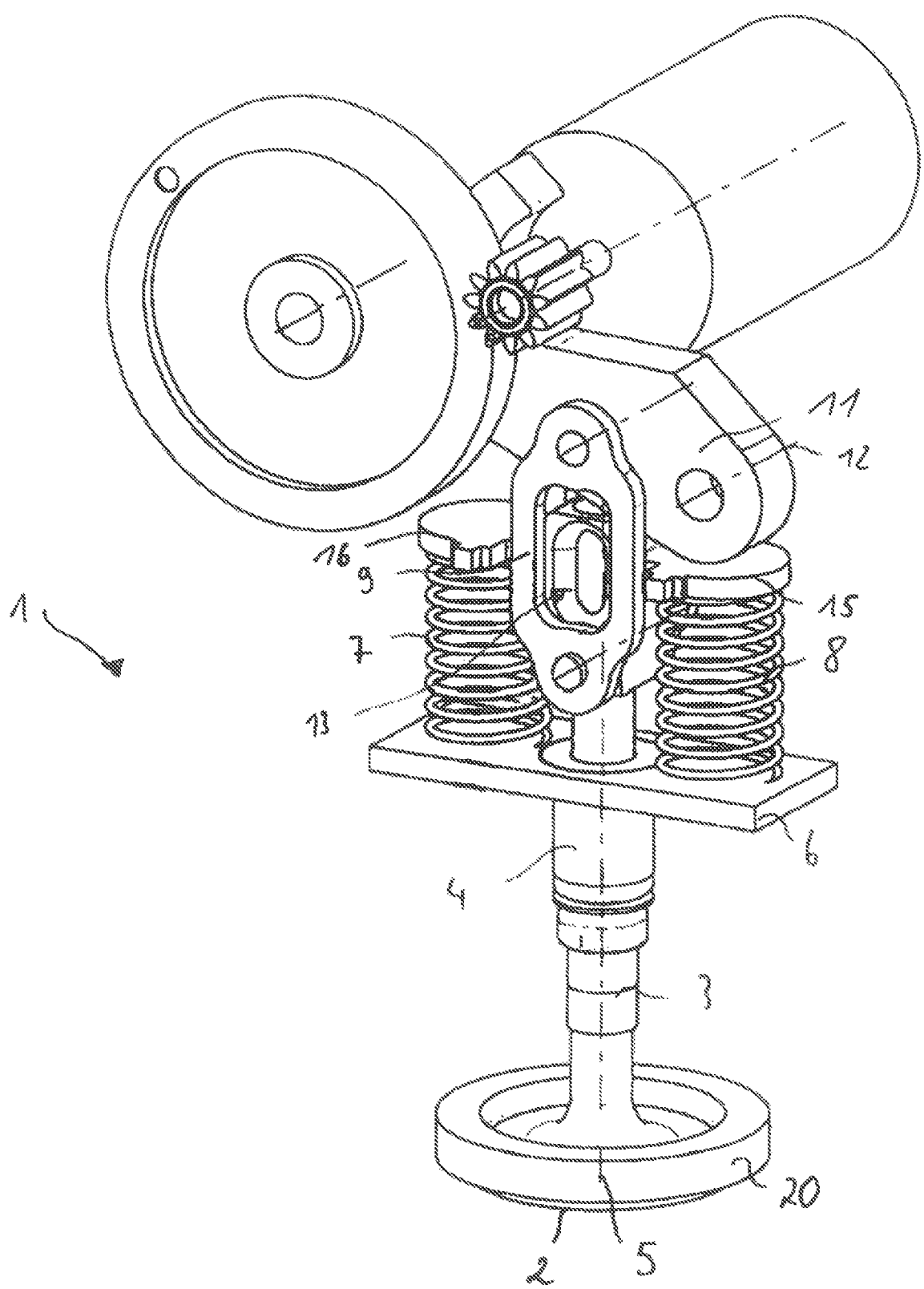
FIG. 1 shows a perspective view of a valve according to an aspect of the invention with two springs arranged parallel to the valve plunger, which springs serve as a restoring device.

FIG. 1 shows a perspective view of a valve 1. The valve 1 has a valve disk 2 which is rigidly connected to a valve plunger 3. The valve plunger 3 is mounted so as to be movable along an axis 5 by a radial hearing 4 which is formed by a sleeve. The axis 5 also corresponds to the central axis 5 of the valve plunger 3, The valve disk 2 can be moved along the central axis 5 of the valve plunger 3, whereby the valve disk can be moved into a valve seat 20 or out of the valve seat 20. In this way, a flow path can be opened or closed. The valve seat 20 is indicated in FIGS. 1 to 4 as a ring-shaped element and is preferably part of a housing (the rest of which is not shown) which delimits, for example, a flow duct.

The plate element 6 is illustrated representatively as a spatially fixed structure, for example a housing. The valve 1 can be advantageously integrated into this spatially fixed structure, and in particular, the illustrated springs 7, 8 can be supported relative to the spatially fixed structure.

The upper end region of the valve plunger 3 is arranged between the springs 7 and 8 and is connected by thrust rods 9, 10 to a rocker arm 11 arranged thereabove. The thrust rods 9, 10 are mounted so as to be rotatable both relative to the valve plunger 3 and relative to the rocker arm 11. Only thrust rod 9 is visible in the view of FIG. 1. Thrust rod 10 is visible in FIGS. 3 and 4. The rocker arm 11 is itself mounted so as to be rotatable about a rocker arm axis of rotation 12.

The thrust rods 9, 10 are arranged on both sides of the valve plunger 3 and are arranged so as to be rotationally offset through 90 degrees relative to the springs 7, 8 in the circumferential direction of the valve plunger 3. In the exemplary embodiment of FIG. 1, each of the thrust rods 9, 10 has an aperture 13. The thrust rods 10 shown here are formed, for example, by punched parts composed of a plate-like material. Arranged above and below the aperture 13 are the bearing points, which are formed, for example, by bores in the thrust rods 9, 10. The bores are engaged into by shaft projections which permit a rotatable mounting of the thrust rods 9, 10 both on the rocker arm 12 and on the valve plunger 3.

Through the apertures 13, it is possible in particular to access the upper end region of the valve plunger 3, whereby, for example, the assembly process can be simplified.

The axes of rotation about which the thrust rods 9, 10 are rotatable relative to the valve plunger 3 and relative to the rocker arm 11 axe arranged parallel to the axis of rotation 12 of the rocker arm 11. This is advantageous in order to generate the most stable possible kinematics in the valve 1 and in order to prevent the occurrence of undesired transverse forces and disruptive moments.

The rocker arm 11 is coupled by e toothed segment and a drive disk to a drive motor, such that the rotational movement of the drive motor can be transmitted to the rocker arm 11. By means of a rotation of the rocker arm 11 about the axis of rotation 12, the thrust rods 9, 10 are moved up and down in a manner dependent on the direction of rotation of the drive motor, whereby the valve plunger 3 is ultimately also moved up and down.

The springs 7, 8 are supported by plate-like projections 15, 16 on the valve plunger 3 and thus, in a manner dependent on the movement of the valve plunger 3, generate a preload force between the plate element 6 and the platslike projections 15, 16. A downward movement of the valve plunger 3 causes the springs 7, 8 to be compressed, whereby a preload force opposed to the movement direction is generated. The springs 7, 8 thus assist the restoring movement, that is to say the upward movement, of the valve plunger 3.

Figure 2:
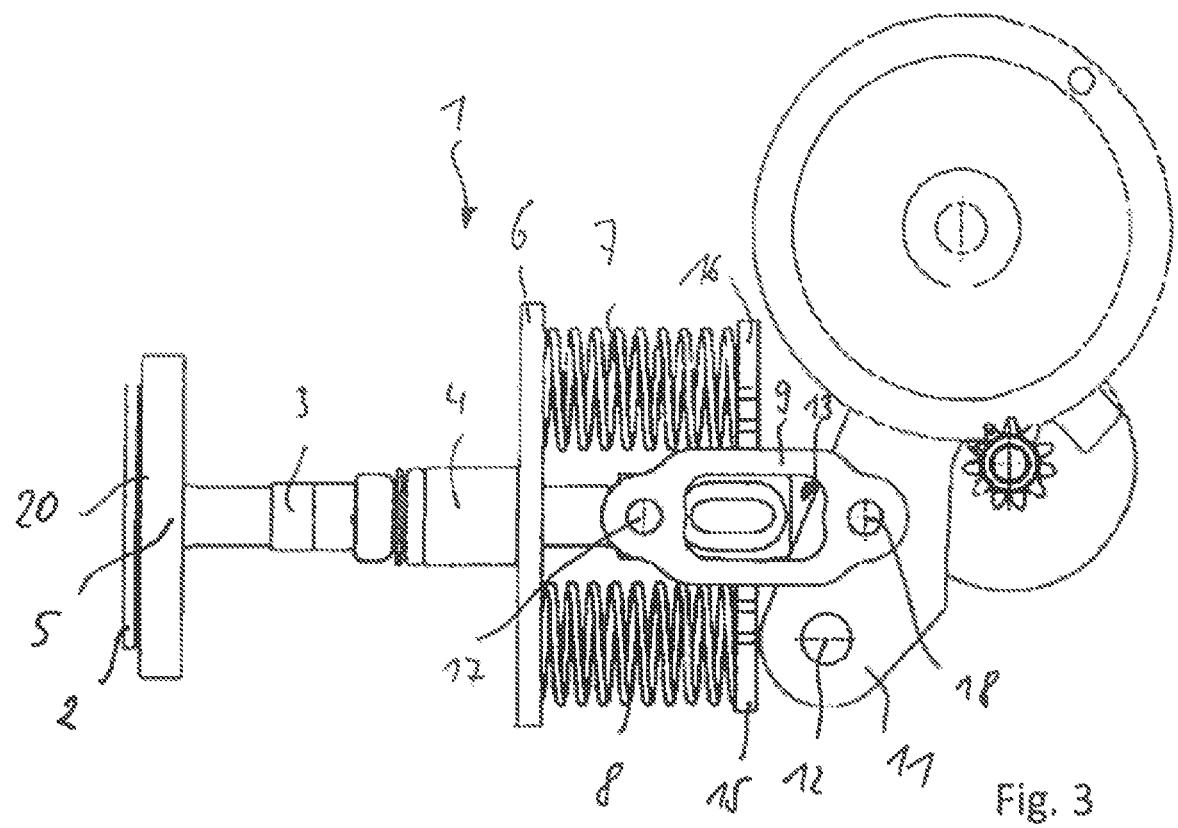
FIG. 2 shows a side view of the valve as per FIG. 1, wherein the central axes of the valve plunger and of the springs lie in the plane of the drawing.
Figure 3:
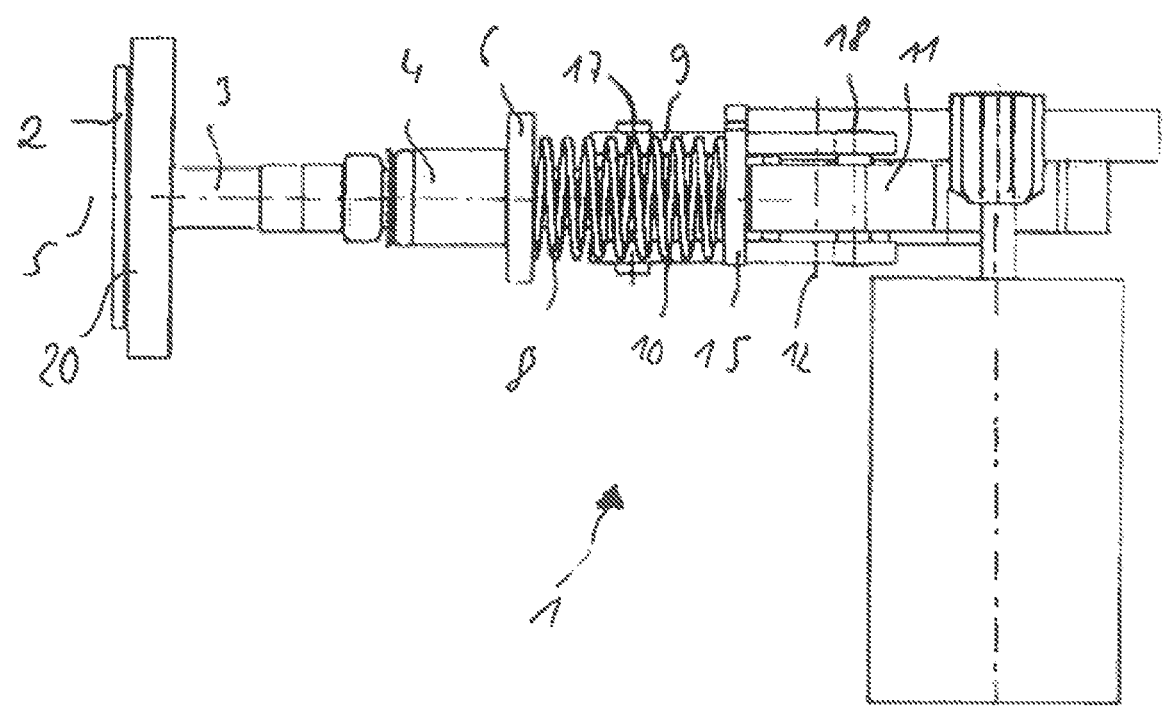
FIG. 3 shows a side view of the valve as per FIGS. 1 and 2, wherein the view of the valve has been rotated through 90 degrees in relation to FIG. 2.
Figure 4:
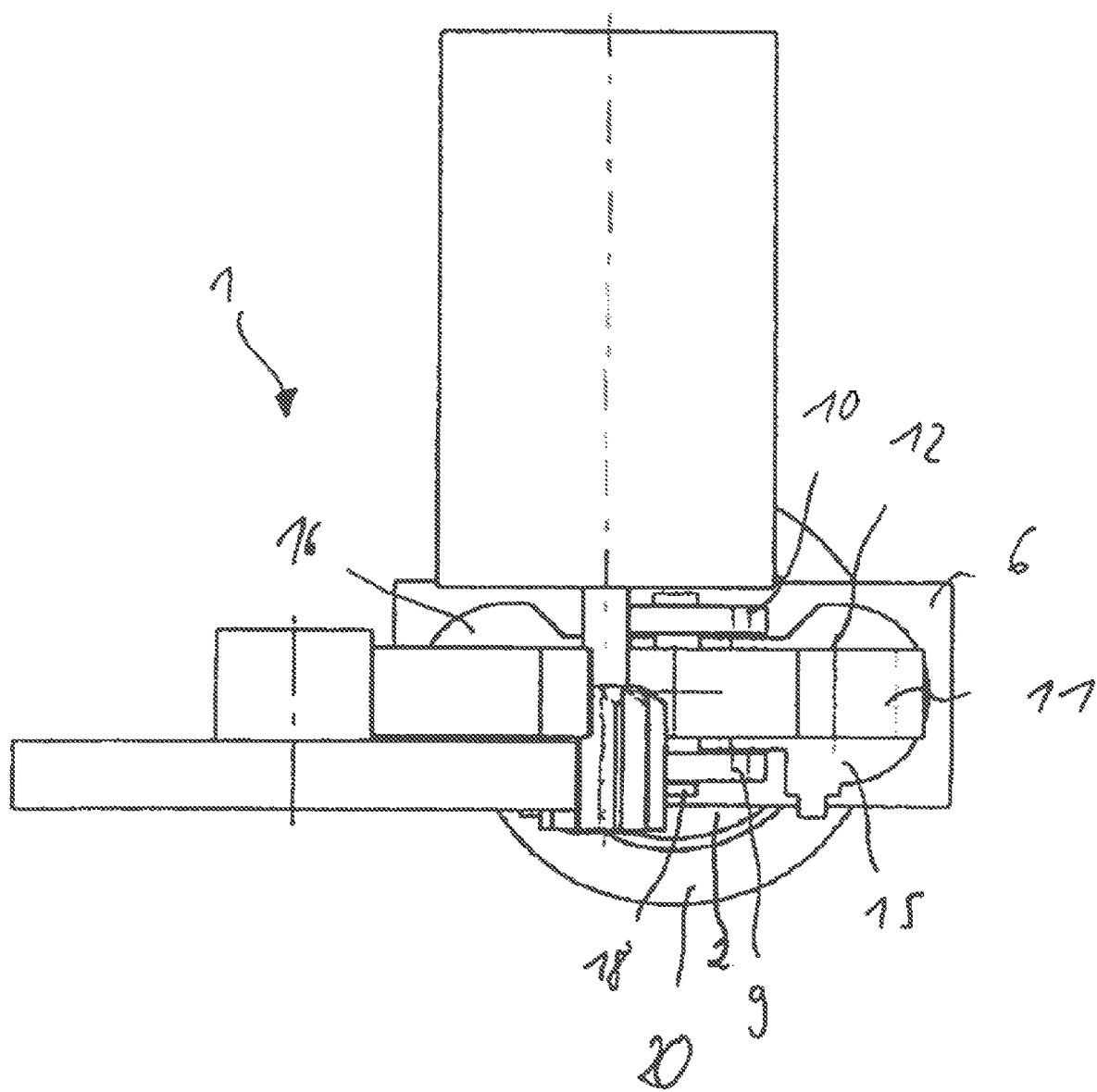
FIG. 4 shows a plan view of the valve as per FIGS. 1 to 3, wherein the view is directed from above along the central axis of the valve plunger.

FIGS. 2 to 4 each show an identical embodiment of the valve 1 of FIG. 1. Identical elements are therefore denoted by the same reference designations.

FIG. 2 shows a side view of the valve 1 of FIG. 1. It is possible in particular to see the parallel arrangement of the springs 7, 8 with respect to the central axis 5. The thrust rods 9, 10 are, in the position of the valve 1 illustrated in FIG. 2, arranged such that the central axis 5 intersects the bearing points 17, 18 of the thrust rods 9, 10. This is advantageous because the transmission of force from the thrust rods 9, 10 to the valve plunger 3 takes place exactly in the direction of the central axis 5 and thus in the movement direction of the valve plunger 3, whereby the acting transverse forces are considerably reduced.

FIG. 3 shows a further side view of the valve 1, wherein it can be seen in particular that the central axis 5 of the valve plunger is congruent with the central plane of the rocker arm 11. In this way, too, the generation of transverse forces is avoided or at least considerably reduced.

FIG. 4 shows a plan view of the valve 1. It can be seen particularly clearly that the plate-like projections 15, 16 of the valve plunger 3 are formed such that the thrust rods 9, 10 can be moved laterally past these projections without colliding therewith. It can also likewise be seen in the plan view that the central axis 5, which is concealed by the rocker arm 11, is arranged exactly centrally between the central axes of the springs 7, 8 and the two thrust rods 9, 10, and runs through the central plane of the rocker arm 11.

The exemplary embodiments in FIGS. 1 to 4 are in particular not of a limiting nature, and serve for illustrating the concept of the invention. Different structural designs of the individual elements are also encompassed by the scope of protection. The replacement of individual elements with elements of substantially identical action, for example with alternative spring elements, is also encompassed by the concept of the invention and thus lies within the scope of protection.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown, and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve (1) for opening or closing a flow path, the valve (1) comprising:
   a valve disk (2);
   a valve plunger (3) having central axis (5);
   a spring-biased restoring device (7, 8) having a compression direction and a relaxation direction, the spring-biased restoring device being coupled to the valve plunger (3);
   a transmission configured to convert a rotational movement into a translational movement, the transmission device having a rocker arm (11) mounted so as to be rotatable about a rocker arm axis of rotation (12); and
   plural plate-shaped thrust rods (9, 10), each plate-shaped thrust rod (9, 10) being rotatably coupled at a first end to the rocker arm (11) and at a second end to the valve plunger (3), so as to couple the rocker arm (11) to the valve plunger (3),
   wherein the valve plunger (3) is arranged between the plate-shaped thrust rods (9, 10), and wherein each of the plate-shaped thrust rods (9, 10) has an aperture (13) through which the valve plunger (3) is accessible, and
   wherein the spring-biased restoring device (7, 8) is configured to generate a force component that counteracts a movement of the valve plunger (3) that is transmitted to the valve plunger (3) by the rocker arm (11) and the plate-shaped thrust rods (9, 10).

2. The valve (1) as claimed in claim 1, wherein the compression direction and the relaxation direction of the spring-biased restoring device (7, 8) run parallel to the central axis (5) of the valve plunger (3).

3. The valve (1) as claimed in claim 1, wherein the spring-biased restoring device (7, 8) comprises two springs (7, 8) arranged parallel to one another.

4. The valve (1) as claimed in claim 3, wherein the valve plunger (3) has plate-shaped projections (15, 16), and wherein the two springs (7, 8) are coupled to one another by the plate-shaped projections (15, 16).

5. The valve (1) as claimed in claim 1, wherein the spring-biased restoring device (7, 8) is supported with respect to a spatially fixed structure (6) surrounding the valve (1), and wherein the restoring device (7, 8) is configured to transmit a spring force between the spatially fixed structure (6) and the valve plunger (3).

6. The valve (1) as claimed in claim 1, further comprising exactly one radial bearing (4), wherein the valve plunger (3) is supported with respect to a spatially fixed structure surrounding the valve (1) by the exactly one radial bearing (4).

7. The valve (1) as claimed in claim 1, wherein the plate-shaped thrust rods (9, 10) comprise two plate-shaped thrust rods, and the two plate-shaped thrust rods (9, 10) are rigidly connected to one another such that motion coupling is realized between the two plate-shaped thrust rods (9, 10).

8. The valve (1) as claimed in claim 1, wherein the rocker arm (11) forms, together with the plat-shaped thrust rods (9, 10) and the valve plunger (3), a knee lever joint.

9. The valve (1) as claimed in claim 1, wherein the valve plunger (3) has, in the region accessible through the apertures (13) in the plate-shaped thrust rods (9, 10), a receiving region for mounting of a sensor element and/or for the connection of a shaft for mounting of the plate-shaped thrust rods (9, 10).

\* \* \* \* \*